United States Patent
Baik et al.

(10) Patent No.: US 10,720,685 B2
(45) Date of Patent: Jul. 21, 2020

(54) METAL AIR BATTERY AND METHOD OF MANUFACTURING THE SAME

(71) Applicants: MEET CO., LTD., Hwaseong-Si (KR); DUCKJIN CO., LTD., Gyeongju-Si (KR)

(72) Inventors: Dong Soo Baik, Yongin-Si (KR); Hee Taek Lee, Seoul (KR); Jung Hwan Lee, Goyang-Si (KR); Dae Hee Lee, Seoul (KR)

(73) Assignees: MEET CO., LTD., Hwaseong-Si (KR); DUCKJIN CO., LTD., Gyeongju-Si (KR)

( * ) Notice: Subject to any disclaimer, the term of this patent is extended or adjusted under 35 U.S.C. 154(b) by 139 days.

(21) Appl. No.: 16/111,826

(22) Filed: Aug. 24, 2018

(65) Prior Publication Data
US 2019/0181520 A1    Jun. 13, 2019

(30) Foreign Application Priority Data

Dec. 13, 2017    (KR) .................. 10-2017-0171324

(51) Int. Cl.
| | |
|---|---|
| *H01M 12/08* | (2006.01) |
| *H01M 12/06* | (2006.01) |
| *H01M 2/08* | (2006.01) |
| *H01M 2/02* | (2006.01) |
| *H01M 2/16* | (2006.01) |
| *H01M 4/42* | (2006.01) |
| *H01M 4/74* | (2006.01) |
| *H01M 4/90* | (2006.01) |

(Continued)

(52) U.S. Cl.
CPC .......... *H01M 12/08* (2013.01); *H01M 2/0202* (2013.01); *H01M 2/0275* (2013.01); *H01M 2/08* (2013.01); *H01M 2/16* (2013.01); *H01M 2/162* (2013.01); *H01M 2/30* (2013.01); *H01M 4/42* (2013.01); *H01M 4/74* (2013.01); *H01M 4/8605* (2013.01); *H01M 4/9041* (2013.01); *H01M 12/06* (2013.01); *H01M 12/065* (2013.01); *H01M 4/8668* (2013.01); *H01M 4/8673* (2013.01); *H01M 4/9016* (2013.01); *H01M 4/92* (2013.01); *H01M 2004/8689* (2013.01)

(58) Field of Classification Search
CPC .... H01M 12/06; H01M 12/08; H01M 2/0202; H01M 2/0275; H01M 2/08; H01M 2/16; H01M 4/42; H01M 4/74; H01M 4/9041
See application file for complete search history.

(56) References Cited

U.S. PATENT DOCUMENTS

| | | |
|---|---|---|
| 3,855,000 A | 12/1974 | Jammet |
| 4,054,726 A | 10/1977 | Sauer et al. |

(Continued)

*Primary Examiner* — Carlos Barcena
(74) *Attorney, Agent, or Firm* — Osha Liang LLP

(57) ABSTRACT

A metal air battery according to one embodiment of the present invention includes a pair of air cathodes having planar shapes respectively, which have a first bonding portion bonded along edges of the pair of the air cathodes and are disposed to face each other; a pair of separators disposed in contact with the pair of the air cathodes; an anode having a planar shape disposed between the pair of the separators and electrically insulated from the pair of the air cathodes; and then a zinc gel disposed in an accommodation space between the pair of the air cathodes. The accommodation space is a space formed by elastic deformation of the pair of the air cathodes.

21 Claims, 18 Drawing Sheets

(51) Int. Cl.
*H01M 2/30* (2006.01)
*H01M 4/86* (2006.01)
*H01M 4/92* (2006.01)

(56) References Cited

U.S. PATENT DOCUMENTS

| | | |
|---|---|---|
| 4,687,714 A | 8/1987 | Oltman et al. |
| 4,894,295 A | 1/1990 | Cheiky |
| 5,439,758 A * | 8/1995 | Stone .................. H01M 2/18 |
| | | 429/63 |
| 2004/0241537 A1* | 12/2004 | Okuyama ........... H01M 2/0275 |
| | | 429/86 |
| 2017/0346147 A1* | 11/2017 | Weisenstein .......... H01M 12/08 |

* cited by examiner

METAL AIR BATTERY AND METHOD OF MANUFACTURING THE SAME

CROSS-REFERENCE TO RELATED APPLICATION

This application claims priority to and the benefit of Korean Patent Application No. 2017-0171324, filed on Dec. 13, 2017, the disclosure of which is incorporated herein by reference in its entirety.

BACKGROUND

1. Field of the Invention

The present invention relates to a metal air battery, and more particularly, to a metal air battery in the form of a pouch.

2. Discussion of Related Art

Generally, a metal air battery refers to a battery in which a metal, such as iron, zinc, magnesium, aluminum, or the like, is used as an anode and an air diffusion electrode, or an oxygen electrode, is used as a cathode. Oxygen in the air is used as an active reactant at the cathode such that a safer and higher energy density may be expected. A zinc air battery using zinc metal as its anode is one of the most commercialized cells.

A zinc air battery is manufactured as a button-type primary battery having a small capacity to be used as a battery for a hearing aid and is manufactured in the form of a prismatic battery as a primary battery having a larger capacity to be used as a portable power source for military purposes. Recently, application of the zinc air battery is expanding to various fields including military equipment, power sources for robotics, disaster recovery equipment, emergency power sources for electric vehicles, and the like as a primary battery with increased capacity. Higher power and larger energy capacity, which are difficult to achieve for a button-type small-sized battery or a prismatic battery, are required for such fields of application. Since the size of a battery increases as its capacity increases, there is a limitation on a cell packaging means. In the case of the button-type battery, a leak-free packaging is possible only for a small sized cell. In the case of a prismatic battery packaged with plastic, costs increase due to requirements for high strength plastic or a bonding process for sealing for preventing deformation or leakage of cells, and yet, a size thereof cannot be made larger due to problems of deformation or leakage. When the size is made larger, deformation due to a volumetric expansion resulting from generation of zinc oxide after discharge becomes severe and the possibility of an electrolyte leakage also increases. Further, since an inner free space in the cell necessary to compensate the volume change, contact between zinc metal particles in the cell before discharge is loosened such that performance of the battery decreases. Furthermore, another important problem for consumers is price as the primary battery, and since the market desires a low-cost primary battery from the simpler manufacturing process and cheap internal components so as to expand the fields of application of a metal air battery.

SUMMARY

The present invention is directed to a new metal air battery having a superior power characteristic and discharge efficiency.

Further, the present invention is directed to a method of manufacturing a metal air battery having a simplified structure which is to be manufactured more easily than a conventional metal air battery such that costs can be reduced.

According to one aspect of the present invention, there is provided a metal air battery which includes a pair of air cathodes having planar shapes respectively, which have a first bonding portion bonded along edges of the pair of the air cathodes and are positioned to face each other; a pair of separators positioned in contact with the pair of the air cathodes; an anode having a planar shape disposed between the pair of the separators and electrically insulated from the pair of the air cathodes; and a zinc gel disposed in an accommodation space between the pair of the air cathodes. The accommodation space is a space formed by elastic deformation of the pair of the air cathodes.

In one embodiment, the air cathode may include a metal mesh or a metal foam as a current collector; and may include a coating layer including a carbon mixture disposed on one surface of the metal mesh or the metal foam. The carbon mixture may include a carbon powder, a fluoride resin, and a catalyst such as manganese dioxide, cobalt oxide, silver, or platinum.

In one embodiment, the zinc gel may include a zinc powder dispersed in an alkaline electrolyte.

In one embodiment, the pair of the separators may include a non-woven fabric containing a thermoplastic resin.

In one embodiment, the pair of separators in contact with the pair of the air cathodes may serve as an adhesive for bonding the pair of the air cathodes in the first bonding portion.

In one embodiment, the anode may include a plurality of first openings configured to allow the zinc gel to pass therethrough.

In one embodiment, the anode may further include a second opening through which the pair of the air cathodes are connected with other.

In one embodiment, the pair of the air cathodes may include a second bonding portion to which a portion of each of the pair of the air cathodes through the second opening is coupled.

In one embodiment, the pair of separators in contact with the pair of the air cathodes may serve as an adhesive for bonding the pair of the air cathodes in the second bonding portion.

In one embodiment, the pair of the air cathodes may be bonded by mechanical bonding in the second bonding portion.

In one embodiment, the metal air battery may further include a cathode terminal coupled to the first bonding portion and extending from the first bonding portion.

In one embodiment, the planar anode may include an anode terminal extending from the anode to the outside of the first bonding portion, and an insulating coating layer may be coated on a contact portion between the anode terminal and the first bonding portion.

In one embodiment, the zinc gel may be disposed to receive compressive stress due to elastic recovery forces of the pair of the air cathodes.

According to another aspect of the present invention, there is provided a method of manufacturing a metal air battery. The method may include (a), preparing first and second air cathodes having planar shapes respectively, and preparing first and second separators having sizes corresponding to those of the first and second air cathodes. The method may include (b), forming a first bonding portion along edges of the first and second air cathodes and the first and second separators to form an air cathode pocket having one open side. The method may include (c), elastically deforming the first and second air cathodes in opposite directions to form an inner accommodation space in the air cathode pocket. The method may include (d), disposing an anode having a planar shape in the inner accommodation space through the one open side of the cathode pocket. The method may include (e), injecting a zinc gel into the inner accommodation space through the one open side of the air cathode pocket. The method may include (f), elastically restoring the elastically deformed first and second air cathodes and sealing the one open side of the air cathode pocket.

In one embodiment, operation (b) may include stacking the first and second air cathodes and the separators in the order of the first air cathode, the first separator, the second separator, and the second air cathode; and hot pressing the edges of the first and second air cathodes and the first and second separators to melt the first and second separators and bonding the first and second planar air cathodes using the first and second separators as a hot melt adhesive.

In one embodiment, the method may further include forming a second bonding portion configured to couple the first and second planar air cathodes to each other, which are connected through an opening in the anode, before operation (e).

In one embodiment, before operation (e), the method further comprises dispersing a zinc powder in an electrolyte; and mixing a gelling agent with the electrolyte with the dispersed the zinc powder to form the zinc gel.

In one embodiment, the method may further include (g), forming a cathode terminal coupled to the bonded edge of the air cathode pocket.

In one embodiment, the planar anode may include an anode terminal extending to the outside of the air cathode pocket, and operation (f) includes applying an insulating coating layer on a bonding portion between the planar anode and the first and second air cathodes and hot sealing to electrically insulate the planar anode from the air cathode pocket.

According to still another aspect of the present invention, there is provided a method of manufacturing a metal air battery. The method may include (a) preparing first and second separators having planar shapes respectively and including a non-woven fabric containing a thermoplastic resin and each having four sides and a predetermined thickness and preparing first and second air cathodes having shapes and sizes which correspond to those of the first and second separators, respectively. The method may include (b), attaching the first and second separators to the first and second air cathodes, respectively. The method may include (c), applying the first and second air cathodes in a direction in which the first and second separators face each other, respectively. The method may include (d), hot pressing edges of three sides among four sides of each of the first and second air cathodes and of each of the first and second separators using a first mold to manufacture an air cathode pocket. The method may include (e) elastically deforming an upper end of the edge of one remaining side of the four sides at which the hot press bonding is not performed, opening an inlet of the air cathode pocket and forming an inner accommodation space. The method may include (f), inserting an anode having a planar shape and having a plurality of openings into the inner accommodation space through the inlet of the air cathode pocket. The method may include (g), injecting a zinc gel into the inner accommodation space. The method may include (h), elastically restoring the upper end of the edge of the one remaining side, and hot pressing the upper end of the edge thereof using a second mold.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
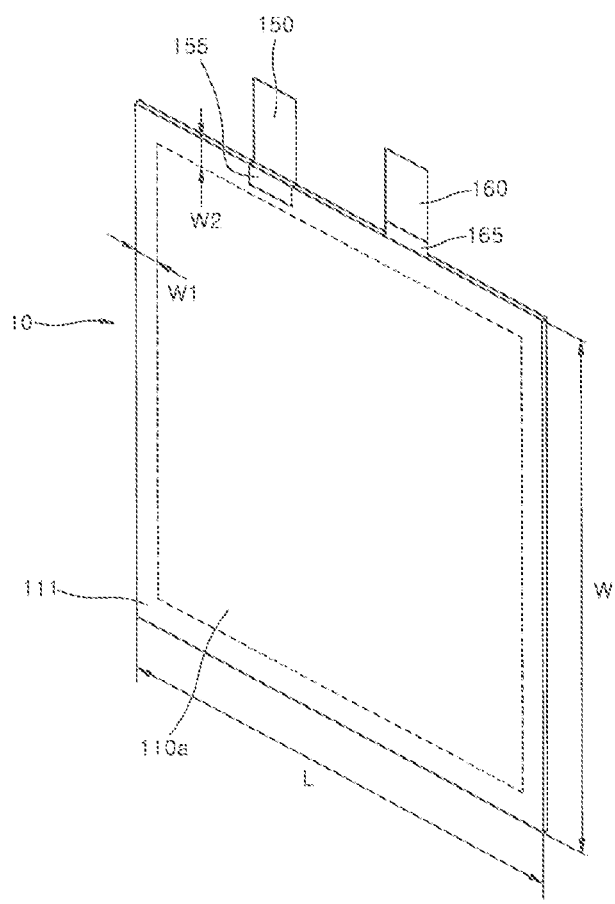
FIG. 1A is a perspective view schematically illustrating a metal air battery according to one embodiment of the present invention.

Hereinafter, embodiments of the present invention will be described in more detail with reference to the accompanying drawings. In the drawings, widths, thicknesses, and the like of the components are somewhat enlarged in order to clearly illustrate the components of each device. It should be noted that the drawings are generally described at the view of an observer, and, when one element is described as being located on other element, this includes a meaning with which the one element may be directly on the top of the other element and also an additional element may be interposed between the one element and the other element.

Like reference numerals refer to substantially like elements throughout a plurality of drawings. Further, it should be understood that the singular form includes the plural form unless the context clearly dictates otherwise, and the terms "including," "having." and the like specify the presence of stated features, numbers, steps, operations, components, parts, or a combination thereof, but do not preclude the presence or addition of one or more other features, numbers, steps, operations, components, parts, or a combination thereof.

According to the inventors, the reason why zinc in a gel form is used is that the formation of an insulating passivation layer on a surface of a zinc metal can be prevented during operation of a battery with the zinc metal plate. When the zinc gel is used as the active material, the forming of the passivation layer can be prevented, but contact property between zinc particles may be deteriorated. Therefore, research is ongoing to decrease contact resistance between the zinc particles by applying an appropriate compressive pressure to the zinc particles, thereby increasing an output and efficiency of the battery. There are a variety of methods of applying such a compressive force, one of which is the use of polyethylene foam or a spring to apply a compressive pressure to an anode of a battery, which is disclosed in U.S. Pat. No. 3,855,000 by J. Jammet. However, according to the inventor of the present application, there may be disadvantages of the above-described method in that a weight and costs of the battery increase due to additional components and a volume thereof increases more than necessary.

Meanwhile, since a zinc air battery absorbs oxygen contained in the air to allow a reaction between zinc and the oxygen, a volume and a weight of the zinc anode material or zinc gel may increase. As a result, zinc anode material exhibits a volumetric expansion of at least 17% to at most 60%, and this volumetric expansion may be one of the technical difficulties of the zinc air battery as disclosed in U.S. Pat. No. 4,687,714 by J. Oltman and U.S. Pat. No. 3,855,000 by J. Jammet. The volumetric expansion may cause electrolyte flooding and electrical short circuit from direct contact between zinc and an air cathode or mechanical damage. There is a general technique to release the volume expansion by leaving an empty space in the cell. In this case, however, the zinc gel moves in the cell under mechanical vibration or shock, and increases the internal resistance due to the empty space between a cathode and an anode, and thus the discharge power and efficiency may decrease.

U.S. Pat. No. 4,054,726 by H. Sauer discloses a technique for compensating for a volume increase corresponding to a volumetric expansion of a zinc gel by inserting a compressible material, that is, a plastic having closed pores, into the zinc gel containing button cell. However, such a compressible material is a nonconductor, and thus inner resistance may increase, reducing performance of the zinc air button cell even though the compressible material can compensate the volume expansion. Further, an increase in defect rate and costs may be caused by this additional component. Furthermore, since an increase in total volume due to an expansion of zinc gel cannot be prevented even though such a means is used, there may occur a phenomenon in which the internal pressure rises and presses against a case, blocking the air passage to the cathode.

U.S. Pat. No. 4,687,714 by J. Oltman discloses a technique for, when the volume of the zinc anode expands, reducing an inner pressure and allowing an expansion by using an easily expandable flexible plastic case. U.S. Pat. No. 4,894,295 by M. Cheiky discloses a configuration in which a container can accommodate a volumetric expansion of the zinc anode in a battery by having an inwardly recessed flexible cell bottom. However, according to the inventors, there is a disadvantage in that such a configuration may not guarantee structural stability of the cell.

When compared with the above-described conventional techniques, the embodiment of the present invention can maintain a stable contact state between zinc particles in the gel during an entire period of discharge by removing or minimizing spare inner space. Further, internal resistance is minimized such that a higher output can be induced, and a fuel utilization rate can be increased. Furthermore, a distribution of the zinc gel inside the metal air battery becomes unstable or variable according to external vibration or impact applied to the metal air battery or according to a laying direction of the metal air battery, such that occurrence of deviation in output or discharge efficiency of the metal air battery can be prevented.

Additionally, when the conventional metal air battery is manufactured, a prism cell or a button cell requires a complicated assembling process and expensive molds, whereas the metal air battery according to the embodiment of the present invention has a cathode pouch or a cathode pocket as a cell package such that a structure can be relatively simplified. Accordingly, simplified processing corresponding to the simplified structure can be performed such that a unit cost of production and a defect rate can be reduced. As a result, the resulting zinc air cell or zinc air battery exhibits not only a high output and a high anode utilization efficiency but also realize a low defect rate and high reliability regardless of relatively low manufacturing cost.

Hereinafter, a structure of a metal air battery having the above-described superior power and discharge efficiency is proposed.

Figure 1B:
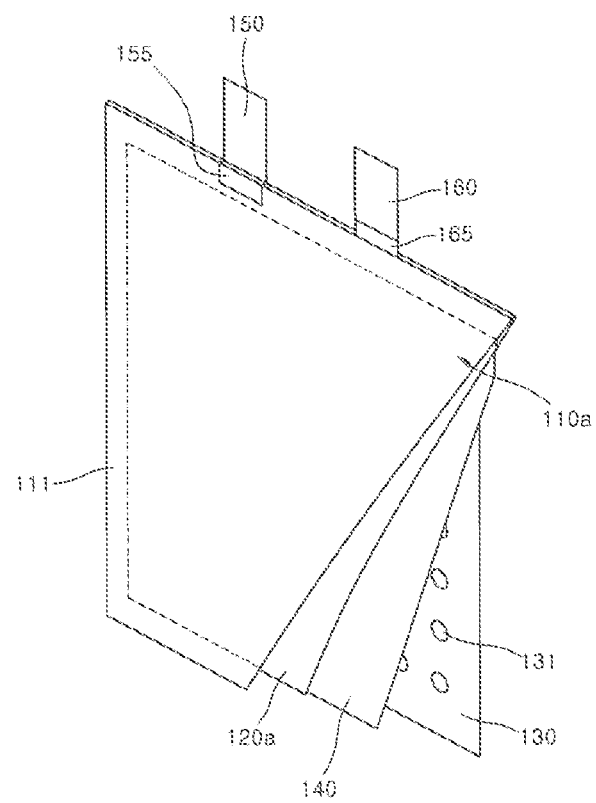
FIG. 1B is a partial cutaway view of the metal air battery of FIG. 1A.

FIG. 1A is a perspective view schematically illustrating a metal air battery according to one embodiment of the present invention. FIG. 1B is a partial cutaway view of the metal air battery of FIG. 1A.

Referring to FIGS. 1A and 1B, a metal air battery 10 includes a pair of air cathodes 110a and 110b, a pair of separators 120a and 120b, and an anode 130. Further, the metal air battery 10 may include a zinc gel 140 which fills a space between the pair of separators 120a and 120b. The pair of the air cathodes 110a and 110b and the pair of the separators 120a and 120b are respectively positioned at positions symmetrical to each other on the basis of the anode 130, and a detailed structure may be understood through a cross-sectional view of the metal air battery 10 shown in FIGS. 2A and 2B.

The pair of the air cathodes 110a and 110b may have a planar shape and be positioned to face each other on the basis of the anode 130. However, although only one air cathode 110a of the pair of the air cathodes 110a and 110b is shown in FIG. 1B, when referring to FIGS. 2A and 2B, the other air cathode 110b may be placed at a side opposite to the anode 130.

The pair of the air cathodes 110a and 110b may have elastically deformable flexibility. Each of the pair of the air cathodes 110a and 110b may have a coating layer containing a carbon mixture on a surface of the metal mesh or the metal foam. For example, the metal mesh or the metal foam may be made of a nickel material. For example, the carbon mixture may contain a carbon powder, a fluoride resin, and a catalyst. For example, polytetrafluoroethylene may be used as the fluoride resin. For example, the carbon powder may be carbon black. The catalyst may include manganese dioxide, cobalt oxide, silver, or platinum. The manganese dioxide may be in the form of a powder. As one example, the coating layers of the pair of the air cathodes 110a and 110b may be in contact with the pair of the separators 120a and 120b, respectively, and the metal meshes or the metal foams of the pair of the air cathodes 110a and 110b may be faced to open air.

The pair of the separators 120a and 120b may be disposed in contact with the pair of the air cathodes 110a and 110b, respectively. The pair of the separators 120a and 120b may have sizes corresponding to those of the pair of the air cathodes 110a and 110b. The pair of the separators may have a planar shape.

The pair of the separators 120a and 120b may include a non-woven fabric made of a thermoplastic resin. As one example, the thermoplastic resin may be made of a material such as polyethylene (PE), polypropylene (PP), polyvinylidene fluoride (PVDF), or the like. The pair of the separators 120a and 120b may serve to prevent the zinc gel 140 from coming into direct contact with the pair of the air cathodes 110a and 110b. The zinc gel 140 is made from dispersing zinc powder in an alkaline electrolyte, therefore the pair of separators 120a and 120b may have alkali resistance.

Referring to FIGS. 1A and 1B, a first bonding portion 111 may be formed along an edge of the metal air battery 10. The first bonding portion 111 may have a form in which edges of the pair of the air cathodes 110a and 110b and of the pair of the separators 120a and 120b are bonded together. As will be described below, the pair of the air cathodes 110a and 110b may be placed outside the pair of separators 120a and 120b so as to surround the pair of the separators 120a and 120b, and then hot pressing may be applied to the edges of the pair of the air cathodes 110a and 110b and of the pair of the separators 120a and 120b. At this point, the separators 120a and 120b locally melted by the hot pressing may act as a hot melt adhesive such that the pair of air cathodes 110a and 110b may be bonded to each other.

As shown in FIGS. 1A and 1B, the pair of the air cathodes 110a and 110b having the edges thereof bonded to each other by the first bonding portion 111 may constitute an outer package of the metal air battery 10. That is, the metal air battery 10 may be in the form of a pouch or pocket in which edges are bonded by the first bonding portion 111 such that an interior of the pouch or the pocket is sealed. As will be described below with reference to FIG. 5A, the metal air battery 10 may have an inner accommodation space formed therein due to elastic deformation of the pair of the air cathodes 110a and 110b by slight pushing the upper edge of the pouch or the pocket in opposite directions. As will be described below with reference to FIG. 5B, the anode 130 and the zinc gel 140 may be disposed or introduced in the inner accommodation space. The inner accommodation space may be sealed by hot pressing another first bonding portion 111.

In one example, as shown in FIG. 1A, each of the pair of the air cathodes 110a and 110b may be in the form of a rectangular plane having a predetermined length L and a predetermined width W. The first bonding portion 111 may be disposed to have first and second widths W1 and W2 along an edge of the rectangular plane. In one example, as shown in FIG. 1A, each of the pair of the air cathodes 110a and 110b may be in the form of a square plane having a length L of 10 cm and a width W of 10 cm, and the first binding portions 111 may each have first and second widths W1 and W2 of 0.4 cm.

Referring back to FIGS. 1A and 1B, a cathode terminal 150 may be disposed to extend outward from the first bonding portion 111. The cathode terminal 150 may be coupled by the first bonding portion 111 and a terminal clamp 155. For example, the cathode terminal 150 made of a metal or a metal alloy, although not shown in detail in the drawings, a well-known mechanical coupling may be used for the clamping of the first bonding portion 111 and the terminal clamp 155. As one example of the mechanical clamping riveting may be applied. The cathode terminal 150 should be electrically connected to each of the pair of the air cathodes 110a and 110b.

Referring to FIG. 1B, the anode 130 may include a metal or a metal alloy. For example, the anode 130 may include copper or copper alloy such as brass, bronze, or phosphor bronze. The anode 130 may be in the form of a thin plate. That is, the anode 130 may have a planar shape. For example, the anode 130 may have a thickness of about 0.1 mm.

The anode 130 may be placed inside the inner accommodation space formed in the metal air battery 10. A plurality of first openings 131 passing through the anode 130 may be included therein. The first openings 131 are installed to allow the zinc gel 140 to pass therethrough, and the first openings 131 may serve to assist movement of the zinc gel 140 to form a uniform distribution of the zinc gel 140 in the metal air battery 10. As will be described below, the zinc gel 140 moves to pass through the anode 130 via the first openings 131 when the pair of the air cathodes 110a and 110b apply a compressive force to the zinc gel 140 through an elastic recovery force, so that the zinc gel 140 may be redistributed in the inner accommodation space.

The anode 130 may include an anode terminal 160 extending from the anode 130 to the outside of the first bonding portion 111. An insulating coating layer 165 may be coated on the anode terminal 160. The insulating coating layer 165 may serve to electrically isolate the anode terminal 160 from the first bonding portion 111.

The insulating coating layer 165 may be formed of a material having a melting point higher than that of the separators 120a and 120b. As one example, the insulating coating layer 165 may be made of polyvinylidene fluoride (PVDF) when the separators 120a and 120b are made of polypropylene (PP). Accordingly, the polypropylene (PP) of the separators 120a and 120b melted at the first bonding portion 111 by heat applied from the outside may bond the insulating coating layer 165 to the pair of the air cathodes 110a and 110b.

Referring back to FIG. 1B, the zinc gel 140 may be injected in the inner accommodation space formed in the metal air battery 10. The zinc gel 140 may pass through the first openings 131 of the anode 130 and be accommodated between the pair of the separators 120a and 120b. The zinc gel 140 may contain a zinc powder dispersed in an electrolyte with a gelling agent. As one example, an aqueous alkali KOH solution may be used as the electrolyte, and a cross-linked acrylic polymer may be used in the gelling agent.

Figure 2A:
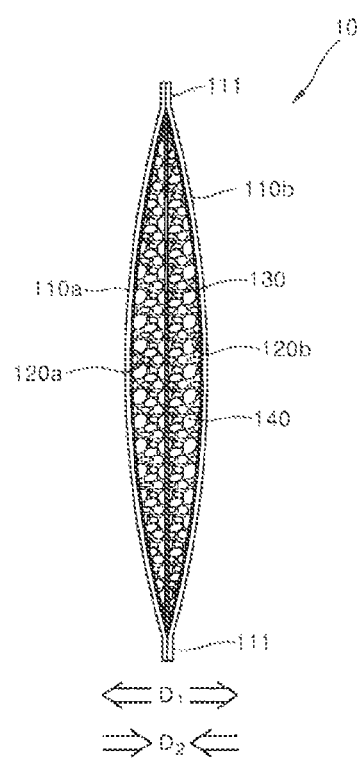
FIGS. 2A and 2B are diagrams schematically illustrating an operation of the metal air battery according to one embodiment of the present invention.
Figure 2B:
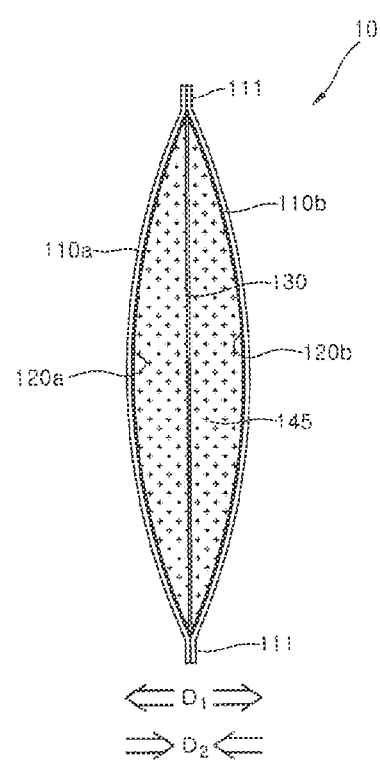
Figure 3:
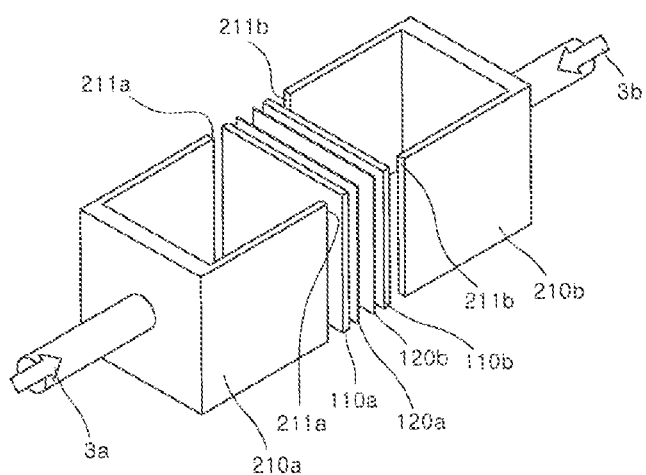
FIGS. 3, 4A, 4B, 4C, 5A, and 5B are diagrams schematically illustrating a method of manufacturing a metal air battery according to one embodiment of the present invention.

FIGS. 2A and 2B are diagrams schematically illustrating the fabrication of the metal air battery according to one embodiment of the present invention. The metal air battery of FIGS. 2A and 2B is a schematic cross-sectional view of the metal air battery 10 described in detail with reference to FIGS. 1A and 1B. FIG. 2A illustrates a configuration of the metal air battery before discharge, and FIG. 2B illustrates a configuration of the metal air battery after full discharge. In the following description, the pair of the air cathodes 110a and 110b are referred to as a first air cathode 110a and a second air cathode 110b, respectively, and the pair of the separators 120a and 120b are referred to as a first separator 120a and a second separator 120b, respectively.

Referring to FIGS. 2A and 2B, the first air cathode 110a and the second air cathode 110b constitute the outer body of the metal air battery 10 in the form of a pouch or a pocket. The outer body in the form of a pouch or a pocket may be formed by the hot pressing the first bonding portion 111 of the air cathodes 110a and 110b and the inserted separators 120a and 120b. The anode 130 and the zinc gel 140 may be positioned in the inner accommodation space in the pouch or the pocket.

Since the inner accommodation space is formed in the pouch or pocket by elastically deforming the first and second air cathodes 110a and 110b in a deformation direction D1 by an external force, the elastically deformed first and second air cathodes 110a and 110b may apply compressive forces in a recovery direction D2 after the external force is removed. The compressive force may continuously maintain a distribution of the zinc gel 140 inside the inner accommodation space by restricting the zinc gel 140 located in the inner accommodation space. As shown in FIG. 2B, even after the full discharge of the metal air battery 10 and the full transformation of zinc gel 140 into a zinc oxide gel 145, the compressive forces may continuously act on the zinc oxide gel 145 in the recovery direction D2 to restrict the zinc oxide gel 145 in the inner accommodation space. As the result, structural stability of the metal air battery 10 can be improved by stably maintaining the distribution of the zinc gel 140 and the zinc oxide gel 145 in the inner accommodation space throughout the whole discharge process.

FIGS. 3, 4A, 4B, 4C, 5A, and 5B are diagrams schematically illustrating a method of manufacturing a metal air battery according to one embodiment of the present invention.

Referring to FIGS. 3 and 4A to 4C, the first and the second air cathodes 110a and 110b having a planar shape and the first and the second separators 120a and 120b each having sizes corresponding to those of the first and the second air cathodes 110a and 110b are prepared and stacked in the order of the first air cathode 110a, the first separator 120a, the second separator 120b, and the second air cathode 120b. The first and the second separators 120a and 120b may also have a planar shape. In one example, the first and the second air cathodes 110a and 110b may each have a shape and a size corresponding to those of the first and the second separators 120a and 120b. That is, the first and the second air cathodes 110a and 110b may be in the form of a quadrangular plane having four sides and of a plate shape having a predetermined thickness.

In one example, the first and the second air cathodes 110a and 110b may be manufactured in the following order. First, each of the air cathodes 110a and 110b is manufactured such that a metal mesh or a metal foam is prepared as a current collector, and a coating layer containing a carbon mixture is coated on one surface of the metal mesh or the metal foam. Further, the air cathodes 110a and 110b may be manufactured by hot pressing the metal mesh or the metal foam, on which the coating layer is formed, at a temperature in a range of 250 to 350° C. As one example, the metal mesh or the metal foam may be made of a pure nickel metal. For example, the carbon mixture may contain a carbon powder, a fluoride resin, and a catalyst. For example, a polytetrafluoroethylene powder may be used in the fluoride resin. For example, the carbon powder may be carbon black. The catalyst may include manages dioxide, cobalt oxide, silver or platinum. As an example, the manganese dioxide may in the form of a powder. The air cathodes 110a and 110b may have elastically deformable flexibility. The coating layer may be disposed to form a contact surface with the first and the second separators 120a and 120b.

The first and the second separators 120a and 120b may include a non-woven fabric containing a thermoplastic resin. As one example, the thermoplastic resin may be made of a material such as polyethylene (PE), polypropylene (PP), polyvinylidene fluoride (PVDF), or the like. Meanwhile, the pair of separators 120a and 120b may have alkali resistance when the zinc gel 140 contains alkaline electrolyte.

In one example, for case of workability, the first and the second separators 120a and 120b may be attached in advance to the first and the second air cathodes 110a and 110b, respectively. At this point, the first and the second separators 120a and 120b may be each attached to the first and the second air cathodes 110a and 110b by electrostatic attraction. Alternatively, the first and the second separators 120a and 120b may be each attached to the first and the second air cathodes 110a and 110b by an aqueous adhesive. As one example, polyvinyl alcohol (PVA), carboxymethyl cellulose (CMC), starch, or the like may be applied as the aqueous adhesive. Subsequently, the first and the second air cathodes 110a and 110 b may be disposed in a direction in which the first and the second separators 120a and 120b face each other.

Referring back to FIG. 3, a pair of U-shaped first molds 210a and 210b are prepared. Subsequently, hot pressing is applied to the edges of the first and the second air cathodes 110a and 110b and of the first and the second separators 120a and 120b using the pair of the U-shaped first molds 210a and 210b along pressure application directions 3a and 3b. The edges of the first and the second air cathodes 110a and 110b and of the first and the second separators 120a and 120b, which are in contact with the U-shaped end portions 211a and 211b of the pair of the first molds 210a and 210b, are bonded to each other. As the bonding result, the first bonding portion 111 is formed along the edges of the first and the second air cathodes 110a and 110b and of the first and the second separators 120a and 120b. Consequently, a pouch or a pocket with one open side is made. That is, the first bonding portion 111 is formed such that the edges of three sides among the four sides of each of the first and the second air cathodes 110a and 110b and of each of the first and the second separators 120a and 120b, which are in the form of a rectangular plate, are bonded by hot pressing.

Figure 4A:
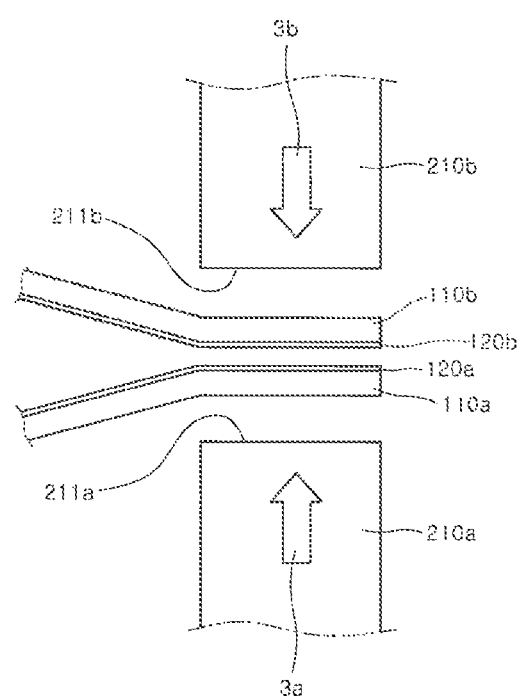
Figure 4B:
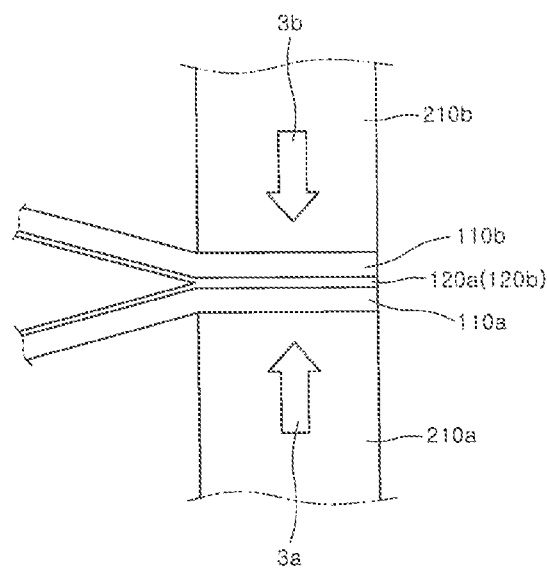
Figure 4C:
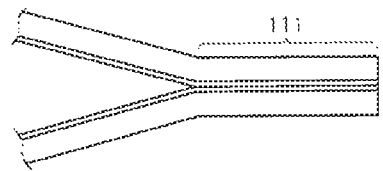

Meanwhile, as shown in FIGS. 4A to 4C, portions of the first and the second separators 120a and 120b, to which hot pressing is applied, may be melted when the U-shaped end portions 211a and 211b of the pair of the first molds 210a and 210b apply the heat and the pressure. The heat and the pressure may be applied to melt the first and the second separators 120a and 120b having relatively low melting points. The melted first and second separators 120a and 120b may serve as a hot melt adhesive and bond the first and the second air cathodes 110a and 110b to form the first bonding portion 111. In one embodiment, when polypropylene (PP) is applied as the first and the second separators 120a and 120b, the polypropylene (PP) may have a melting point lower than that of the polytetrafluoroethylene in the coating layer of each of the first and the second air cathodes 110a and 110b. Accordingly, the first and the second separators 120a and 120b may be easily applied as the adhesive. The first molds 210a and 210b may maintain a temperature in a range of 150 to 350° C.

Figure 5A:
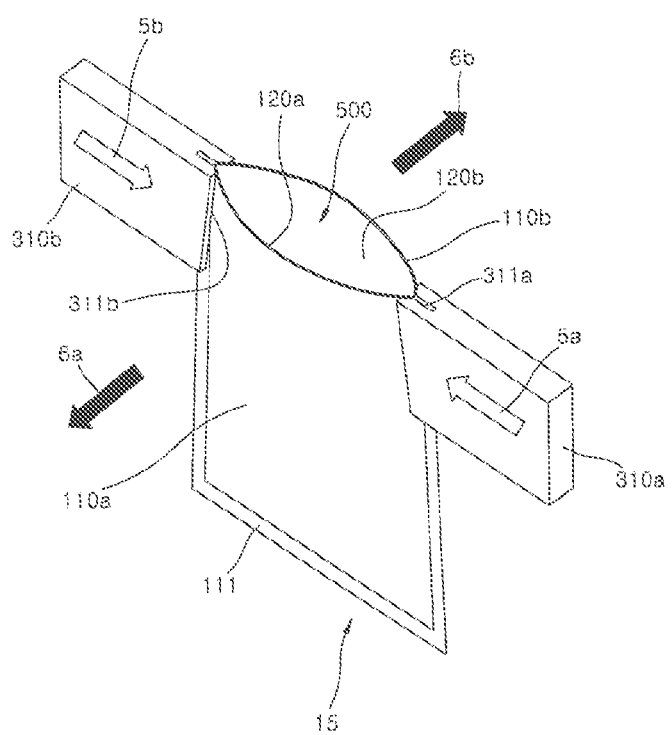

Referring to FIG. 5A, portions of the first bonding portion 111, which are located opposite to each other on the basis of an air cathode pocket 15, are each fixed to a pair of fixing molds 310a and 310b. To this end, the pair of the fixing mechanisms 310a and 310b may each have fixing terminals 311a and 311b which are in direct contact with the first bonding portion 111. Subsequently, a force is applied to the pair of the fixing mechanisms 310a and 310b in compression directions 5a and 5b such that the first and the second air cathodes 110a and 110b may be elastically deformed in deformation directions 6a and 6b, respectively. At this point, the first and the second air cathodes 110a and 110b may be elastically deformed in opposite directions. According to the elastic deformation of the first and the second air cathodes 110a and 110b, as shown in FIGS. 3 and 4A to 4C, one side of the air cathode pocket 15, at which the first bonding portion 111 is not formed by the U-shaped first molds 210a and 201b, is open such that an inner accommodation space 500 may be formed. That is, an upper end of an edge of one remaining side of the four sides, at which the hot pressing is not performed, is elastically deformed using the fixing dies 310a and 310b such that an inlet of the air cathode pocket 15 may be opened and the inner accommodation space 500 may be formed. Subsequently, the anode 130 may be disposed or inserted inside the inner accommodation space 500. Then, the zinc gel 140 may be injected into the inner accommodation space 500.

According to one example, the zinc gel 140 may be produced by dispersing a zinc powder in an electrolyte and then mixing the electrolyte with a gelling agent. As one example, an aqueous alkali KOH solution may be used as the electrolyte, and a crosslinked acrylic polymer may be used in the gelling agent.

According to one example, the anode 130 may include a metal or a metal alloy. For example, the anode 130 may include copper or copper alloy. The copper alloy may include brass, bronze, or phosphor bronze. The anode 130 may be in the form of a thin plate. For example, the anode 130 may have a thickness of about 0.1 mm. As shown in FIG. 1B, the anode 130 may include therein the plurality of first openings 131 passing therethrough. The first openings 131 are installed to allow the zinc gel 140 to pass therethrough, and the first openings 131 may serve to assist movement of the zinc gel 140 to form a uniform distribution of the zinc gel 140 in the metal air battery 10.

According to another example, the anode 130 may be disposed in the inner accommodation space 500, and then the zinc gel 140 may be injected thereinto.

Figure 5B:
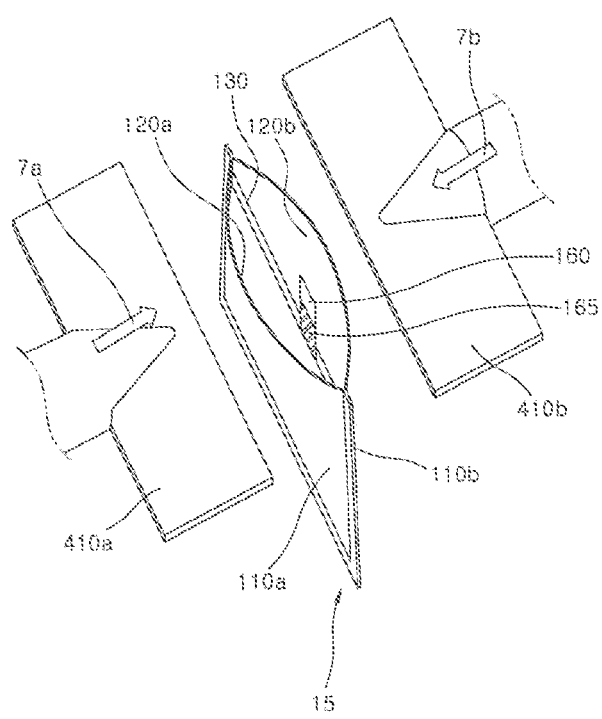

Referring to FIG. 5B, the pair of the fixing dies 310a and 310b of FIG. 5A are removed from the air cathode pocket 15 to elastically restore the elastically deformed pocket 15. At this point, the first and the second air cathodes 110a and 110b may apply compressive forces to the zinc gel 140 in the inner accommodation space 500. Subsequently, the one open side of the air cathode pocket 15 is sealed using second molds 410a and 410b. That is, the upper end of the edge of the elastically deformed one side is elastically restored and is thermo-pressure bonded using the second molds 410a and 410b such that the one open side may be sealed.

Specifically, the process of sealing the one open side may proceed as follows. Firstly, the pair of the second molds 410a and 410b are prepared. Subsequently, the air cathode pocket 15 of FIG. 5A is placed between the pair of the second molds 410a and 410b. Then, heat and pressure are applied to the first and the second air cathodes 110a and 110b and the first and the second separators 120a and 120b, which each have the one open side, to bond edges of the one open sides of the first and the second air cathodes 110a and 110b and of the first and the second separators 120a and 120b. A method of bonding the edges is the same as the method of forming the first bonding portion 111, which is described in detail with reference to FIGS. 3 and 4A to 4C.

Referring to FIG. 5B, however, the anode 130 inserted into the inner accommodation space 500 may include the anode terminal 160 extending from the anode 130. In order to prevent the anode 130 from being in electrical contact with the first and the second air cathodes 110a and 110b during the bonding process, the insulating coating layer 165 is coated on a bonding portion between the anode terminal 160 and the first and second air cathodes 110a and 110b, and then the sealing process is performed such that the anode terminal 160 and the air cathode structure 15 may be electrically insulated from each other. polyvinylidene fluoride (PVDF) may be a main component of a material constituting the insulating coating layer 165. The insulating coating layer 165 may be coated and formed at a predetermined position when the anode 130 and the anode terminal 160 are manufactured. Polypropylene (PP), which has a relatively low melting point, may be used as the separators 120a and 120b during thermal sealing. Therefore, polypropylene (PP) at a portion at which the anode terminal 160 is located is melted when heat is applied, but polyvinylidene fluoride (PVDF), which has a relatively high melting point, may maintain a solid state without melting. Accordingly, the insulating coating layer 165 may secure a thickness required for insulation. Consequently, polypropylene (PP) and polyvinylidene fluoride (PVDF) are bonded to each other such that the sealing is completed.

Although not shown in the drawings, after the air cathode structure 15 is sealed, a cathode terminal may be formed and bonded to a bonding portion formed at the edge. The cathode terminal may have a configuration the same as that of the cathode terminal 150 of FIGS. 1A and 1B, and the terminal clamp 155 and the bonding portion may be coupled by a well-known mechanical coupling. As one example of the mechanical coupling, riveting may be used.

Figure 6A:
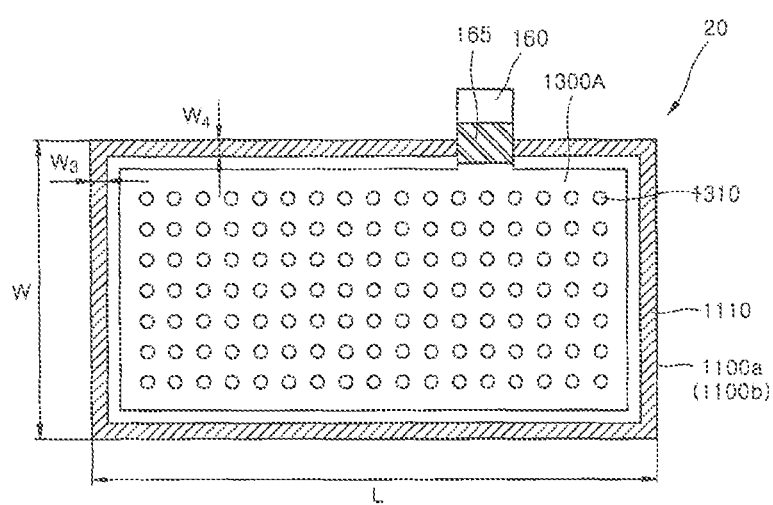
FIGS. 6A and 6B are cross-sectional views schematically illustrating a structure of a metal air battery according to another embodiment of the present invention.
Figure 6B:
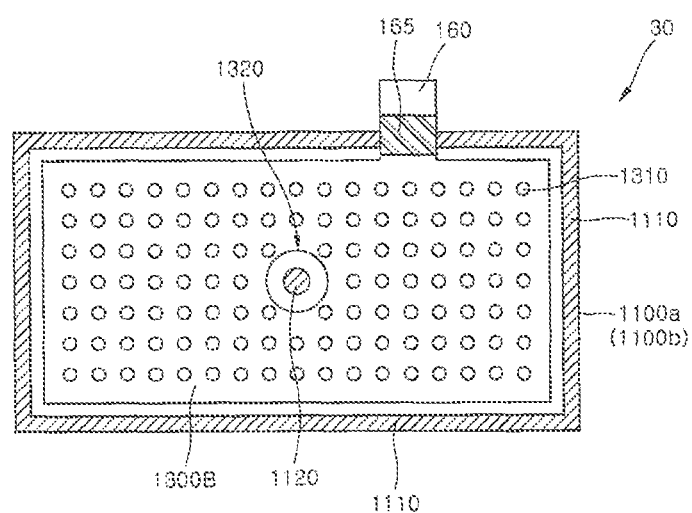
Figure 7A:
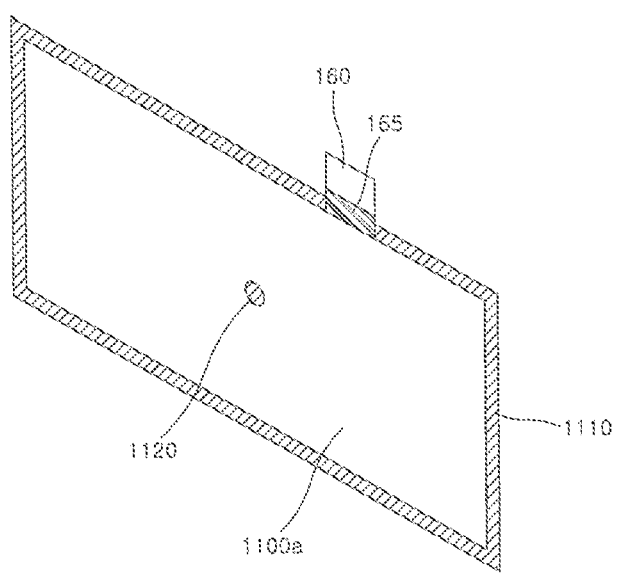
FIGS. 7A and 7B are diagrams schematically illustrating a method of manufacturing a metal air battery according to another embodiment of the present invention.
Figure 7B:
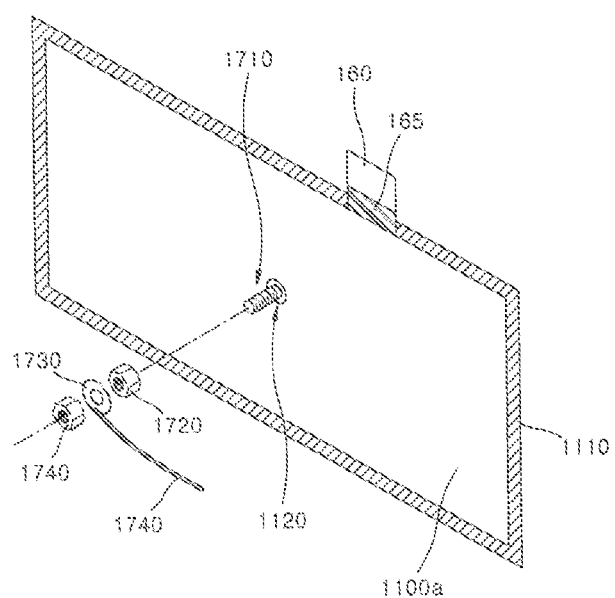

FIGS. 6A and 6B are cross-sectional views schematically illustrating a structure of a metal air battery according to another embodiment of the present invention. FIGS. 7A and 7B are diagrams schematically illustrating a method of manufacturing a metal air battery according to another embodiment of the present invention.

Referring to FIG. 6A, a metal air battery 20 may have a configuration the same as that of the metal air battery 10 described in detail with respect to FIGS. 1A and 1B, except for including first and the second air cathodes 1100a and 1100b each having a length L and a width W which are different from each other, separators (not shown) having sizes corresponding to those of the air cathodes 1100a and 1100b, a first bonding portion 1110, and an anode 1300A. As one example, the metal air battery 20 may have a length L of 20 cm and a width W of 10 cm. The first bonding portion 1110 may have widths W3 and W4 of 0.4 cm, which is the same as the first and second widths W1 and W2 of the first bonding portion 111 of the metal air battery 10 of FIGS. 1A and 1B. The anode 1300A may have first openings 1310 which pass through the anode 1300A. A zinc gel may move to pass through the first openings 1310 due to compressive forces of the first and second air cathodes 1100a and 1100b such that a distribution of the zinc gel may be uniformized.

Meanwhile, since a length L of the metal air battery 20 of FIG. 6A is increased to twice a length L of the metal air battery 10 of FIG. 1, a compressive force acting on the zinc gel inside the first and the second air cathodes 1100a and 1100b may be reduced. Accordingly, a metal air battery 30 shown in FIG. 6B, which is capable of preventing reduction of the above-described compressive force, is proposed as an embodiment.

Referring to FIG. 6B, an anode 1300B of the metal air battery 30 may further include a second opening 1320 through which the anode 1300B is connected to a cathode. The second opening 1320 may be larger in size than each of the first openings 1310.

The first and the second air cathodes 1100a and 1100b may be coupled such that at least portions thereof directly face each other through the second opening 1320. Further, first and second separators may be disposed between the first and the second air cathodes 1100a and 1100b. The portions of the first and the second air cathodes 1100a and 1100b, which directly face each other through the second opening 1320, are bonded such that a second bonding portion 1120 may be formed.

Referring to FIG. 7A, bonding is illustrated as one embodiment of a method of forming the second bonding portion 1120. First and second separators (not shown) disposed between the first and the second air cathodes 1100a and 1100b may be melted when appropriate levels of heat and pressure are applied to the second bonding portion 1120, and the melted first and second separators may bond the first and second air cathodes 1100a and 1100b to each other. The melted first and second separators may serve as an adhesive.

Referring to FIG. 7B, mechanical coupling is illustrated as another embodiment of the method of forming the second bonding portion 1120. That is, the first and the second air cathodes 1100a and 1100b may be coupled using a bolt 1710 and first and second nuts 1720 and 1740. A washer 1730 may be disposed between the first and the second nuts 1720 and 1740 to form a cable 1740 extending from the washer 1730. The cable 1740 may be connected to a cathode terminal of the metal air battery 30.

Although not shown in the drawings, a modified example using a bolt and a nut may be applied as another embodiment of the mechanical coupling. Alternatively, riveting, which is well-known, may be applied. According to still another embodiment, in order to prevent a leakage of a zinc gel of an electrolyte from the second bonding portion 1120, a method of providing an adhesive to the second bonding portion 1120 or installing a rubber seal may be further applied. According to yet another embodiment, by penetrating and coupling the pair of the air cathodes 1100a and 1100b using a bolt, a rivet, or a nail, and filling surroundings of the coupled portion with an adhesive, bonding may be used to prevent the leakage of the zinc gel from the second bonding portion 1120.

As described above, the second bonding portion 1120 is additionally installed such that the first and the second air cathodes 1110a and 1110b may apply sufficient compressive forces to the zinc gel distributed inside the inner accommodation space. Consequently, a contact level or a contact property between the zinc gels can be improved, and structural stability of the metal air battery can be ensured.

As described above, the metal air battery according to one embodiment of the present invention is provided with elastically deformable air cathode pouch or pocket. Air cathodes apply compressive forces to the zinc gel, which is an active material, such that the contact level or the contact property among the zinc particles can be improved, and its discharge efficiency also can be improved.

According to the embodiments of the present invention, even when the discharged zinc oxide gel having a volume larger than that of the undischarged zinc gel, the zinc oxide gel may be still maintained in a state of being acted upon by the compressive forces of the air cathodes. Accordingly, even when external vibration or impact is applied to the metal air battery, stable distributions of the unreacted zinc gel and the zinc oxide gel may be maintained such that a loss of zinc discharge efficiency can be prevented.

Further, when the metal air battery is configured, the pair of the air cathodes constitute an outer body in the form of a pouch or a pocket such that there is an advantage in that other additional components, such as a frame made of a plastic or metal material, or an outer container, are not required.

Hereinafter, examples representing the idea of the present invention will be described in detail.

Example 1

Zinc and a zinc alloy powder to which bismuth (Bi), indium (In), and aluminum (Al) were added were prepared. The zinc alloy powder may have an average size of 100 μm. The zinc alloy powder was dispersed in a 35% KOH aqueous solution and a crosslinked acrylic polymer was mixed as a gelling agent to manufacture a zinc gel. At this point, a commercially available Umicore product was applied to the zinc alloy powder, and a commercially available Carbopol 940 polymer was used as the gelling agent. A weight of the zinc gel injected into the metal air battery was 80 g, and a zinc content in the zinc gel was 61.2 wt %. A total weight of the metal air battery was 106.4 g after the cathode terminal and the anode terminal was coupled.

Each of the pair of air cathodes were in the form of a square plane having a length of 10 cm and a width of 10 cm, and the first bonding portion was manufactured to maintain a width of 0.4 cm. The anode employed a thin film having a length of 8 cm and a width of 8 cm excluding the extending anode terminal. The anode has the first openings aligned to form a plurality of rows.

A hydrophilic polypropylene non-woven fabric was used as the separators, and a weight of the hydrophilic polypropylene non-woven fabric was 0.66 g. Each of the pair of air cathodes are made of a nickel foam coated with a carbon mixture, and the carbon mixture may include carbon powder, a fluoride resin, and manganese dioxide. An ADE52 product by MEET Co. LTD. was applied to the pair of air cathodes.

Then, a constant current discharge test was performed on the metal air battery of Example 1 and performance of the metal air battery was determined. The constant current discharge test was performed under current conditions of 2 A, 5 A, and 10 A. A method of measuring a current capacity was performed such that the metal air battery was cut off at a point at which a voltage V of a measured cell dropped to 0.7 V, and then a value of the current capacity was measured at that point.

Example 2

In the metal air battery of Example 2, a weight of the zinc gel injected into the metal air battery was increased to 101 g in comparison to that of the metal air battery of Example 1. In this case, however, the zinc content in the zinc gel was 61.2 wt %, which was maintained the same as that in Example 1.

A total weight of the metal air battery was 127.4 g after the cathode terminal and the anode terminal were coupled.

Then, a constant current discharge test was performed on the metal air battery of Example 2 and performance of the metal air battery was determined. The constant current discharge test was performed under current conditions of 2 A, 5 A, 10 A, and 12 A. The current capacity was determined until the metal air battery reached at the cut off voltage of 0.7 V.

Example 3

Like the embodiment of FIG. 6A, in the metal air battery of Example 3, each of the pair of air cathodes was in the form of a square plane having a length of 20 cm and a width of 10 cm, and the first bonding portion was manufactured to maintain a width of 0.4 cm. The anode employed a thin film having a length of 8 cm and a width of 18 cm excluding the extending anode terminal. A weight of a zinc gel injected into the metal air battery was 200 g.

The remaining configuration of the metal air battery was the same as that of Example 1.

Then, a constant current discharge test was performed on the metal air battery of Example 3 and performance of the metal air battery was determined. The constant current discharge test was performed under a current condition of 4 A. The current capacity was determined until the metal air battery reached at the cut off voltage of 0.7 V.

Example 4

In the metal air battery of Example 4, the second bonding portion of the pair of air cathodes were formed at a central portion of the anode using an insulating bolt like in the embodiment of FIG. 6B. The remaining configuration and experimental conditions of the metal air battery were the same as those of Example 3.

Then, a constant current discharge test was performed on the metal air battery of Example 4 and performance of the metal air battery was determined. The constant current discharge test was performed under a current condition of 4 A. The current capacity was determined until the metal air battery reached at the cut off voltage of 0.7 V.

Comparative Example

A conventional prism cell was prepared. The prism cell had a size of 10 cm×10 cm (length×width) and a body thereof was made of fiber-reinforced plastic. An inner space had a length of 8.8 cm, a width of 8.8 cm, and a height of 0.5 cm. 80 g of the zinc gel was injected into the inner space, a copper foil was inserted as the anode, and the air anode and the separators were installed apart from each other. At this point, 20% spare space was formed inside the prism cell.

A constant current discharge test was performed on the metal air battery of the comparative example, and performance of the metal air battery was determined. The constant current discharge test was performed under current conditions of 1 A, 2 A, and 5 A. The current capacity was determined until the metal air battery reached at the cut off voltage of 0.7 V.

Consideration

Figure 8:
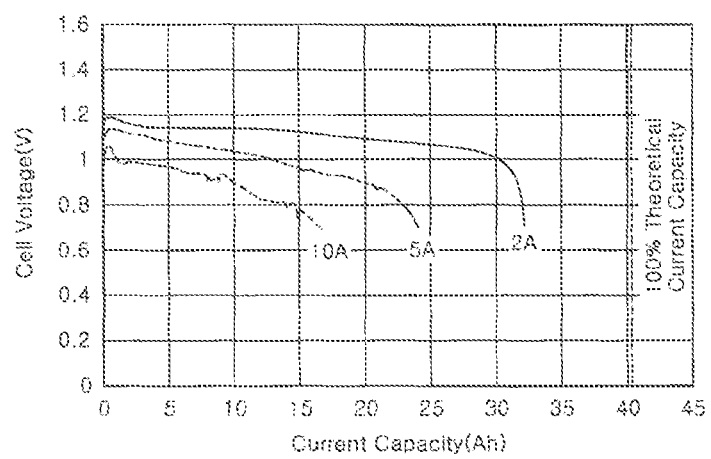
FIGS. 8 to 10 are graphs illustrating discharge characteristics of the metal air battery according to one embodiment of the present invention.

The results of the constant current discharge test for Example 1 are shown in Table 1 and FIG. 8.

TABLE 1

| Electrical Measurement Result | Measuring Current (A) | CC | 2 | 5 | 10 |
|---|---|---|---|---|---|
| | Current Capacity (Ah) | Theoretical Value | 40.15 | 40.15 | 40.15 |
| | | Measured Value (0.7 V cut-off) | 32.20 | 24.00 | 16.60 |
| | Discharge Efficiency (%) | | 80.20% | 59.78% | 41.35% |
| | Average Voltage (V) | | 1.098 | 0.984 | 0.8644 |
| | Power (Wh) | | 35.36 | 23.62 | 14.35 |
| | Energy Density (Wh/kg) | | 332.18 | 221.88 | 134.82 |

Referring to Table 1 and FIG. 8, when a constant current of 2 A was provided, the discharge efficiency was measured as 80.20%, the average voltage was measured as 1.098 V, the power was measured as 35.36 Wh, and the energy density was measured as 332.18 Wh/kg, which shows a superior result. Under the current conditions of 2 A, 5 A, and 10 A, the results were measured to be lower than a theoretical value of 100% of the current capacity available in the structure of Example 1.

Figure 9:
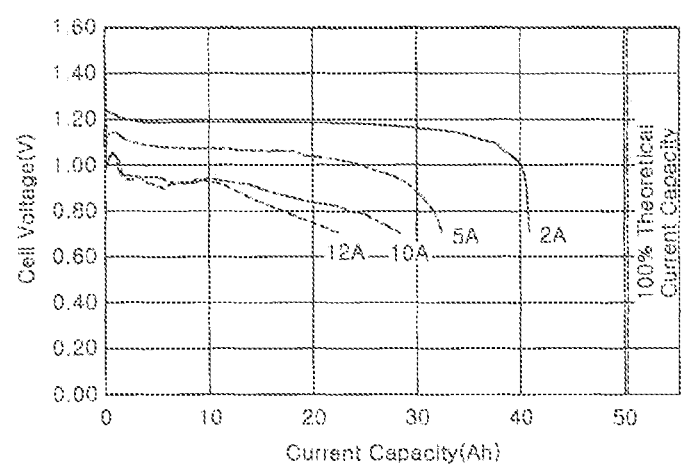

The results of the constant current discharge test for Example 2 are shown in Table 2 and FIG. 9.

TABLE 2

| | Measuring Current (A) | CC | 2 | 5 | 10 | 12 |
|---|---|---|---|---|---|---|
| Electrical Measurement Result | Current Capacity (Ah) (0.7 V cut-off) | Theoretical Value | 50.69 | 50.69 | 50.69 | 50.69 |
| | | Measured Value | 41.00 | 35.33 | 28.34 | 22.54 |
| | Discharge Efficiency (%) | | 80.89% | 69.70% | 55.91% | 44.47% |
| | Average Voltage (V) | | 1.15 | 1.03 | 0.892 | 0.869 |
| | Power (Wh) | | 47.15 | 36.39 | 25.28 | 19.58 |
| | Energy Density (Wh/kg) | | 370.0 | 285.6 | 198.37 | 153.65 |

Referring to Table 2 and FIG. 9, when a constant current of 2 A was provided, the discharge efficiency was measured as 80.89%, the average voltage was measured as 1.15 V, the power was measured as 47.15 Wh, and the energy density was measured as 370.0 Wh/kg, which shows a superior result. Under the current conditions of 2 A, 5 A, 10 A, and 12 A, the results were measured to be lower than a theoretical value of 100% of the current capacity available in the structure of Example 2.

Figure 10:
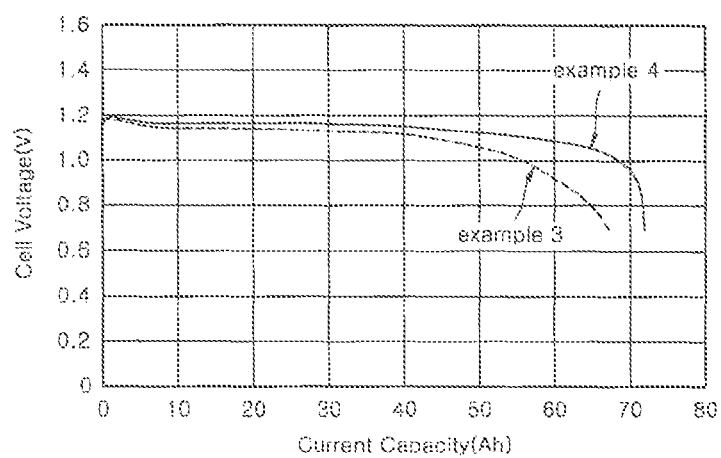

The results of the constant current discharge tests for Examples 3 and 4 are shown in Table 3 and FIG. 10.

TABLE 3

| | | | Example 3 | Example 4 |
|---|---|---|---|---|
| Electrical Measurement Result | Measuring Current (A) | CC | 4 | 4 |
| | Current Capacity (Ah) | Theoretical Value | 100.37 | 100.37 |
| | | Measured Value (0.7 V cut-off) | 66.90 | 71.80 |
| | Discharge Efficiency (%) | | 66.65% | 71.54% |
| | Average Voltage (V) | | 1.08 | 1.128 |
| | Power (Wh) | | 72.25 | 81.00 |
| | Energy Density (Wh/kg) | | 286.94 | 317.51 |

Referring to Table 3 and FIG. 10, when a constant current of 4 A was provided, the discharge efficiency was measured as 71.54%, the average voltage was measured as 1.128 V, the power was measured as 81.00 Wh, and the energy density was measured as 317.51 Wh/kg in the metal air battery of Example 4 such that a discharge characteristic result of the metal air battery of Example 4 was shown to be superior to that of Example 3.

Figure 11:
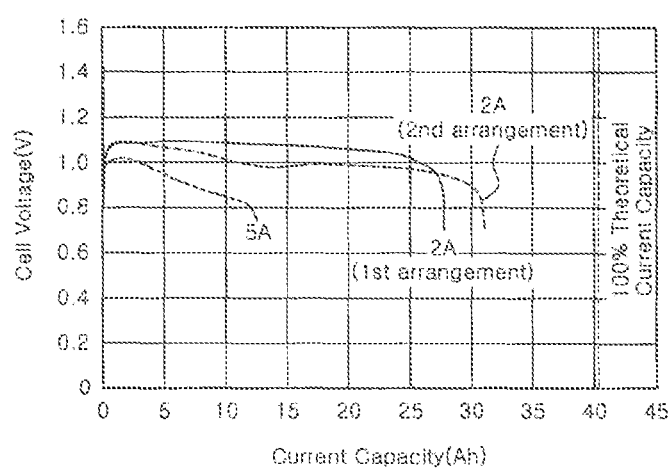
FIG. 11 is a graph illustrating a discharge characteristic of the metal air battery according to one comparative example of the present invention.

The results of the constant current discharge test for the comparative example are shown in FIG. 11. In the case of the metal air battery of the comparative example, when constant currents of 1 A and 2 A were provided, the discharge efficiency was represented as about 65%, but it was difficult to obtain reproducible discharge efficiency despite the results of repeated tests when a constant current of 5 A was provided, and a low discharge efficiency of 40% or less was also shown.

Further, it was determined that the discharge characteristic varied according to an arrangement of the metal air battery. Referring to FIG. 11, when a constant current of 2 A was provided, a value of the current capacity in a case in which the metal air battery was vertically disposed to be upright (a first arrangement) was different from that of the current capacity in a case in which the metal air battery was horizontally disposed to be laid on a side surface (a second arrangement).

The metal air battery according to one embodiment of the present invention is provided with elastically deformable air cathodes. The air cathodes apply the compressive forces to a zinc gel, which is an active material such that contact resistance between zinc particles contained in the zinc gel can be reduced. Consequently, discharge performance of the metal air battery can be improved. That is, since the zinc gel is maintained in a stable distribution by the compressive forces of the air cathodes, loss of a distribution state of the zinc gel active material due to a state in which the air cathode electrodes are disposed can be prevented. Consequently, the discharge efficiency can be prevented from being lowered.

Even when a zinc oxide gel having a volume larger than that of the zinc gel before discharge, the zinc oxide gel may be still maintained in a state of receiving compressive forces from the air cathodes. Accordingly, even when external vibration or impact is applied to the metal air battery, contact between the metal zinc particles can be maintained. As a result, a loss of zinc discharge efficiency can be prevented during the reaction of the metal air battery.

Further, when the metal air battery is configured, the pair of air cathodes constitute an outer body in the form of a pouch such that there is an advantage in which a separate body, such as a frame made of a plastic or metal material, or a separate component, such as an outer container, is not required.

While the present invention has been described with reference to the drawings and the embodiments, a person skilled in the art can understand that various alternations and modifications of the embodiments described herein may be made without departing from the spirit and scope of the present invention as defined by the appended claims.

What is claimed is:

1. A metal air battery comprising:
a pair of air cathodes having planar shapes respectively, which have a first bonding portion bonded along edges of the pair of the air cathodes and are disposed to face each other;
a pair of separators disposed in contact with the pair of the air cathodes;
an anode having a planar shape disposed between the pair of the separators and electrically insulated from the pair of the air cathodes; and
a zinc gel contained in an accommodation space between the pair of the air cathodes,
wherein the accommodation space is a space formed by elastic deformation of the pair of the air cathodes.

2. The metal air battery of claim 1, wherein the pair of air cathodes include:
a metal mesh or a metal foam as a current collector; and
a coating layer disposed on one surface of the metal mesh or the metal foam and including a carbon mixture,
wherein the carbon mixture includes a carbon powder, a fluoride resin, and a catalyst,
and wherein the catalyst comprises any one of manganese dioxide, cobalt oxide, silver, or platinum.

3. The metal air battery of claim 1, wherein the zinc gel includes a zinc powder dispersed in an alkaline electrolyte.

4. The metal air battery of claim 1, wherein:
the pair of the separators maintain electrical insulation between the pair of the air cathodes and the zinc gel; and
each of the pair of the separators include a non-woven fabric containing a thermoplastic resin.

5. The metal air battery of claim 1, wherein the pair of the separators in contact with the pair of the air cathodes serve as an adhesive for bonding the pair of the air cathodes in the first bonding portion.

6. The metal air battery of claim 1, wherein the anode includes a plurality of first openings configured to allow the zinc gel to pass therethrough.

7. The metal air battery of claim 6, wherein:
the anode further includes a second opening through which the pair of the air cathodes are connected with each other; and
the pair of the air cathodes include a second bonding portion to which a portion of each of the pair of the air cathodes through the second opening is coupled.

8. The metal air battery of claim 7, wherein the pair of the separators in contact with the pair of the air cathodes serve as an adhesive for bonding the pair of the air cathodes in the second bonding portion.

9. The metal air battery of claim 7, wherein the pair of the air cathodes are bonded by mechanical bonding in the second bonding portion.

10. The metal air battery of claim 1, further comprising a cathode terminal coupled to the first bonding portion and extending from the first bonding portion.

11. The metal air battery of claim 1, wherein:
the anode includes an anode terminal extending from the anode to an outside of the first bonding portion; and
an insulating coating layer is coated on a contact portion between the anode terminal and the first bonding portion.

12. The metal air battery of claim 1, wherein the zinc gel is disposed to receive compressive stress due to elastic recovery forces of the pair of the air cathodes.

13. A method of manufacturing a metal air battery, comprising:
(a) preparing a first air cathode and a second air cathode, the first and the second air cathodes having planar shapes respectively, and preparing first and second separators having sizes corresponding to those of the first and second air cathodes;
(b) forming a first bonding portion along edges of the first and second air cathodes and the first and second separators to form an air cathode pocket having a one open side;
(c) elastically deforming the first and second air cathodes in opposite directions to form an inner accommodation space in the air cathode pocket;
(d) disposing an anode having a planar shape in the inner accommodation space through the one open side of the air cathode pocket;

(e) injecting a zinc gel into the inner accommodation space through the one open side of the air cathode pocket; and (f) elastically restoring the elastically deformed first and second air cathodes and sealing the one open side of the air cathode pocket.

14. The method of claim 13, wherein the first and second air cathodes include:

a metal mesh or a metal foam as a current collector; and a coating layer coated on one surface of the metal mesh or the metal foam, wherein the coating layer includes a carbon mixture.

15. The method of claim 13, wherein the first and the second separators include non-woven fabrics containing a thermoplastic resin.

16. The method of claim 13, wherein operation (b) includes:

stacking the first and second air cathodes and the first and second separators in the order of the first air cathode, the first separator, the second separator, and the second air cathode; and hot pressing the edges of the first and second air cathodes and the first and second separators to melt the first and second separators, and bonding the first and second air cathodes using the first and second separators as a hot melt adhesive.

17. The method of claim 13, wherein the method further includes forming a second bonding portion configured to couple the first and the second air cathodes to each other, which are connected through an opening in the anode, before operation (e).

18. The method of claim 17, wherein before operation (e), the method further comprising:

dispersing a zinc powder in an electrolyte; and mixing a gelling agent with the electrolyte with the dispersed the zinc powder to form the zinc gel.

19. The method of claim 13, further comprising (g) forming a cathode terminal coupled to the bonded edge of the air cathode pocket.

20. The method of claim 13, wherein:

the anode includes an anode terminal extending to an outside of the air cathode pocket; and operation (f) includes applying an insulating coating layer on a bonding portion between the anode and the first and second air cathodes, and includes sealing to electrically insulate the anode from the air cathode pocket.

21. A method for manufacturing a metal air battery, comprising:

(a) preparing first and second separators having planar shapes respectively and including a non-woven fabric containing a thermoplastic resin and each having four sides and a predetermined thickness, and preparing first and second air cathodes having shapes and sizes which correspond to those of the first and second separators, respectively;

(b) attaching the first and second separators to the first and second air cathodes, respectively;

(c) applying the first and second air cathodes in a direction in which the first and second separators face, respectively;

(d) hot pressing edges of three sides among four sides of each of the first and second air cathodes and of each of the first and second separators using a first mold to manufacture an air cathode pocket;

(e) elastically deforming an upper end of the edge of one remaining side of the four sides at which the hot pressing is not performed, opening an inlet of the air cathode pocket, and forming an inner accommodation space;

(f) inserting an anode having a planar shape and having a plurality of openings into the inner accommodation space through the inlet of the air cathode pocket;

(g) injecting a zinc gel into the inner accommodation space; and (h) elastically restoring the upper end of the edge of the one remaining side, and hot pressing the upper end of the edge thereof using a second mold.

\* \* \* \* \*